INVENTOR.
Willard D. Eakin

May 4, 1954 W. D. EAKIN 2,677,352
FLUID-ACTUATED MOTOR AND PISTON-VALVE ASSEMBLY
Filed Feb. 16, 1951 4 Sheets-Sheet 2

INVENTOR.
Willard D. Eakin

May 4, 1954 W. D. EAKIN 2,677,352
FLUID-ACTUATED MOTOR AND PISTON-VALVE ASSEMBLY
Filed Feb. 16, 1951 4 Sheets-Sheet 4

INVENTOR.
Willard D. Eakin

Patented May 4, 1954

2,677,352

UNITED STATES PATENT OFFICE 2,677,352

FLUID-ACTUATED MOTOR AND PISTON-VALVE ASSEMBLY

Willard D. Eakin, Akron, Ohio, assignor to Clyde E. Bannister, Houston, Tex.

Application February 16, 1951, Serial No. 211,315

3 Claims. (Cl. 121—153)

1

This invention relates to piston-valve assemblies and, more specifically, to a motor assembly comprising a fluid-actuated main motor and a fluid-actuated auxiliary motor having a piston-valve assembly for controlling the ports of the main motor.

Such an assembly makes unnecessary the use of an over-center spring for assuring complete reversal of the ports of the main motor in each cycle of operation, and the force of fluid pressure, for shifting the valve of the main motor, can be more uniform throughout the length of the valve's port-reversing movement than the force of an over-center spring, which exerts its greatest force at the beginning of the movement and a decreasing force throughout the rest of the movement.

My chief objects are to provide, in a piston-valve assembly and in a motor assembly of this type, simplicity and economy of construction, dependability, and durability; to provide simplicity of assembly and disassembly; to provide self-energized sealing of the ports of the main motor; to provide also permissible self-energized sealing of the ports of the auxiliary motor, and of the piston-valve against lengthwise leakage of fluid; to provide improved means for causing the main motor to reverse the ports of the auxiliary motor; to avoid excessive aggregate length of seal-or-leakage lines in such an assembly; to provide symmetry of structure and of application of forces in such an assembly, as for avoidance of bearing load; and to provide an auxiliary motor adapted to control the ports of either an oscillating main motor or a reciprocating main motor, alternatively, with but little required modification of the means for causing the main motor to reverse the ports of the auxiliary motor.

Figure 1:
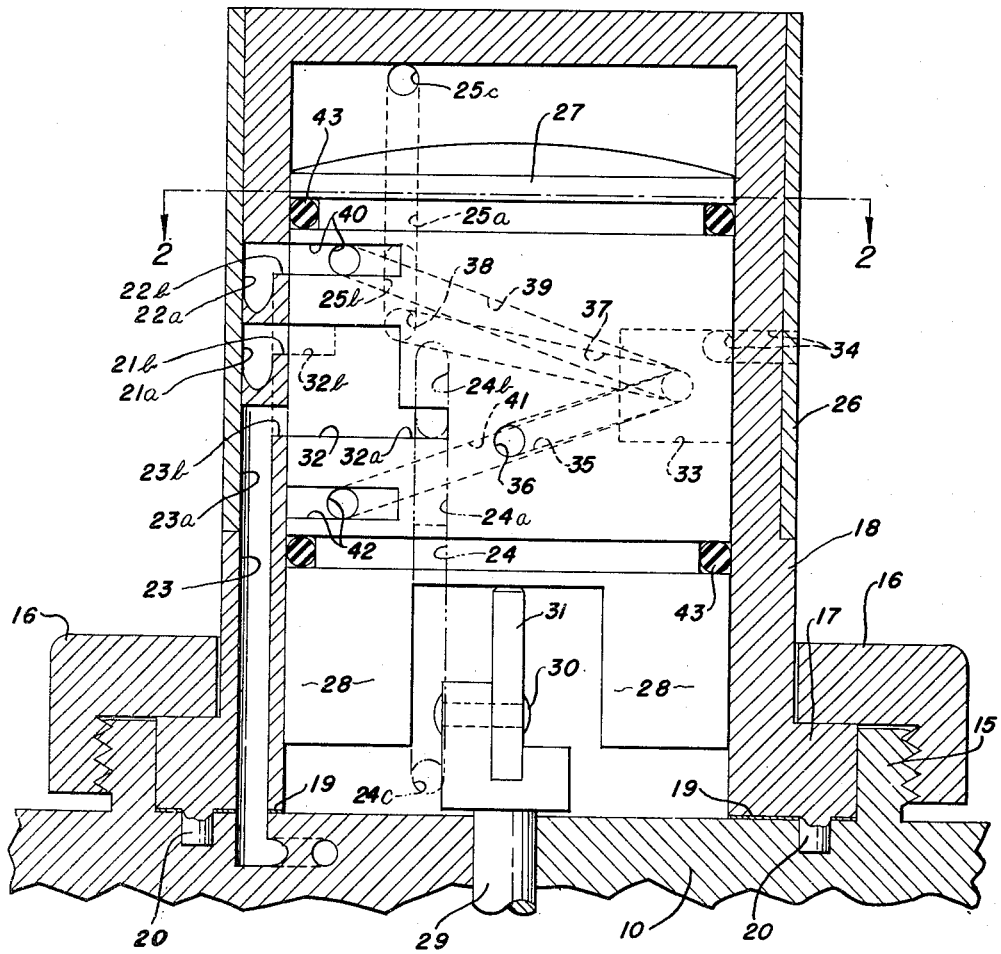
Fig. 1 is a section, on the indirect line 1—1 of Fig. 2, of parts of a main motor of a shaft-oscillating type and a valve-reversing auxiliary motor associated therewith, the assembly embodying my invention in its preferred form as applied to a motor of the shaft-oscillating type.

The invention is shown in the present drawings as being incorporated in a motor assembly

2 of which the main motor is of a shaft-oscillating type well known in the field of wind-shield-wiper motors driven by pressure-differential created by suction from the intake manifold of the vehicle-driving motor.

The invention, however, is of course not limited to suction motors or to motors of the shaft-oscillating type. A wind-shield-wiper motor was chosen for experimentation and for purposes of illustration in the present drawings because the low pressure differential provided by the intake manifold provides an extreme test for the practicability of the invention and especially in matters such as the amount of cross-sectional area and length of stroke required for the fluid-impelled member of the auxiliary motor, and the effectiveness of the self-energized sealing of the ports.

The main motor here illustrated comprises the usual, but here slightly modified, casing 10 and piston or vane 11 (Fig. 3) oscillated therein for driving the usual windshield wiper arm 12.

Instead of being formed with the usual hollow boss for the housing of numerous small port-reversing ports, the two sections of the casing 10, having between them the usual thin gasket 13, against which they are clamped by bolts 14, 14, are formed with respective halves of a threaded nipple 15 adapted to have screwed thereon a flanged collar 16 engaging a base flange 17 on a cup-shaped cylinder 18 for holding the latter in fixed position and sealed to the two sections of the main-motor casing 10. A thin gasket 19 and dowels 20, 20 are interposed between the cylinder and the main-motor casing.

Figure 4:
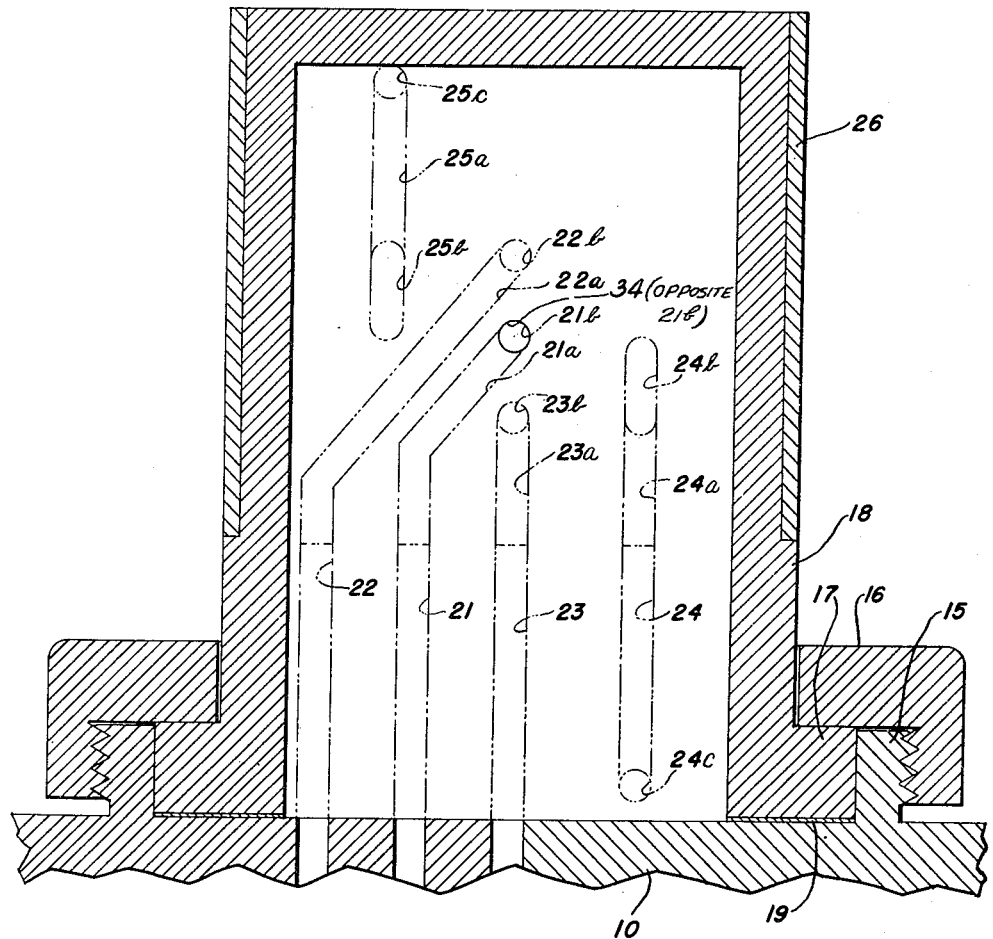
Fig. 4 is a section on the indirect line 4—4 of Fig. 2, with the piston omitted, the dot-and-dash lines representing ports and passages that are in the omitted near half of the cylinder, for clearness of comparison with Fig. 1.
Figure 5:
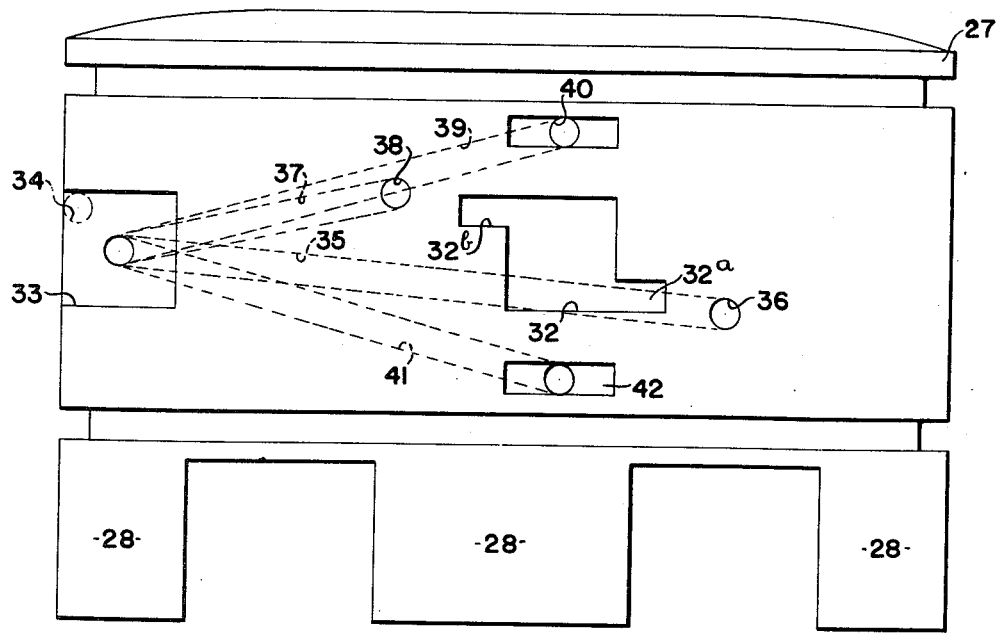
Fig. 5 is a right cylindrical developed view of the piston.

In Figs. 1 and 4 the passages and ports of the cylinder that are on the near side of the section line are shown, conventionally, in dot-and-dash lines, and the curved section gives the effect of a "development" of cylinder and, in Fig. 1, of the piston.

As one simple way of providing the necessary suction passage, 21, in communication with the intake manifold of the vehicle-driving motor, and the pressure-and-suction passages, 22, 23, in communication with the interior of the casing 10, on respective sides of its vane 11, the cylinder 18 is of stepped-down outer diameter in its upper portion and has in the outer face of that portion a suction groove 21$^a$ in extension of the passage 21 and leading from a suction port 21$^b$ open to the interior of the cylinder, a pressure-and-suction groove 22$^a$ in extension of the passage 22 and leading from a port 22$^b$, and a groove 23$^a$, in extension of the passage 23 and leading from a port 23$^b$.

Similarly, for charging and venting the lower end of the cylinder 18, its wall is formed with a hole 24 and groove 24ᵃ connecting ports 24ᵇ and 24ᶜ opening into the cylinder, and for charging and venting the upper end of the cylinder its wall is formed with a groove 25ᵃ connecting ports 25ᵇ and 25ᶜ opening into the cylinder.

The grooves are closed by a sealing sleeve 26 fitted upon the grooved, small-diameter part of the cylinder.

The ports 22ᵇ, 21ᵇ, 23ᵇ preferably are vertically aligned.

In the cylinder is mounted a piston 27, which, for an air-actuated motor, preferably is of carbon composition such as is extensively used as the material of one of the slip-seal members in fluid-conducting rotary seals. Such a composition has the advantages of being self-polishing and self-lubricating, and of having a coefficient of heat-expansion approximating that of the metal of the cylinder, so that the fit of the piston in the cylinder is substantially the same in warm weather and with the temperature as low as zero.

The lower end of the piston 27 is slotted or otherwise provided with a pair of turning-legs 28, 28 (Fig. 1), and for engaging these legs, at preferably equal distances from the axis of rotation and concurrently, the conventional valve-reversing shaft 29 of the main motor has, set in a notch in the step of its head and secured to the half-cylinder part of its head by a rivet 30, a thin piston-turning plate 31, extending upward between the turning-legs 28 of the piston, the latter being vertically slidable with relation to the turning plate and having such space between them that circumferentially of the assembly there is lost motion between them and the plate, so that the piston will be given only a short turning movement, near the end of each half-cycle rotative movement of the piston-turning plate 31.

To avoid the necessity of extreme accuracy for causing the plate 31 to engage both of the legs 28, a slight leanability of the plate 31 preferably is provided, as by making it of slightly bendable material, permissibly with a narrow part (not shown) between its upper and lower ends, or by giving it a loose fit in its groove and not making quite tight the rivet 30.

The plate 31 serves as a thrust bearing for the piston 27 and for that reason the plate preferably has its upper edge face rounded in all directions so that it will abut the lower end face of the piston, between the turning legs, only in the vicinity of the turning axis of the piston.

Likewise the upper end face of the piston is of dome shape, for center contact only with the upper end wall of the cylinder.

I find that the frictional engagement of the side face of the piston with the cylinder wall provides sufficient resistance for preventing turning of the piston by the plate 31 before it contacts the turning legs, and especially when the port arrangement is such that there is self-energized sealing of some or all of the cylinder's ports 22ᵇ, 21ᵇ, 23ᵇ, 24ᵇ, and 25ᵇ by the difference of fluid pressure on the two sides of the piston.

The piston 27 is formed with a suction or exhaust recess 32 on one of its sides, this recess being of such size, shape and position in its rectangular main portion that is in constant communication with the suction or exhaust port 21ᵇ of the cylinder, throughout all of the oscillating and reciprocating movements of the piston. The piston thus has, at all times, its own low-pressure chamber (the recess 32), for appropriate systematic connection to the several ports of the cylinder that require such connection.

At a part of its side wall circumferentially spaced from the low-pressure recess 32, and preferably at a position diametrically opposite to it, the piston is formed with a high-pressure recess 33, this recess being of such size, shape and position that it is in constant communication with a high-pressure port 34 in the wall of the cylinder, here shown as a hole simply extending through the wall of the sleeve 26 and of the cylinder from the atmosphere. The piston thus has, at all times, its own high-pressure chamber (the recess 33), for appropriate systematic connection to the several ports of the cylinder requiring such connection.

Figure 2:
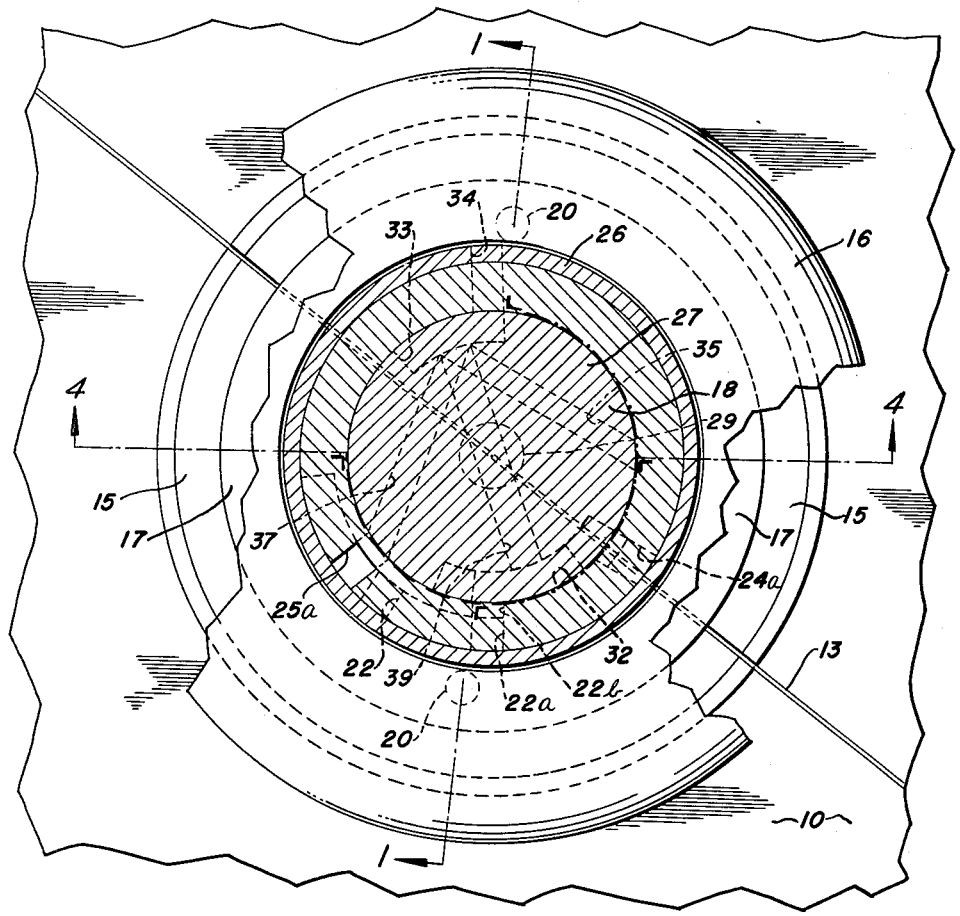
Fig. 2 is a section on line 2—2 of Fig. 1.

The piston is formed with a hole 35 extending from the recess 33 to a port 36 which is in position to open into the cylinder's port 24ᵇ (Fig. 1), when the piston is turned clockwise as viewed in Fig. 2, and with a hole 37 extending from the recess 33 to a port 38 adapted to open into the cylinder's port 25ᵇ when the piston is turned counterclockwise as viewed in Fig. 2.

Correspondingly the piston is formed with a wing extension 32ᵃ of the low pressure recess for opening into the cylinder's port 24ᵇ when pressure is supplied to the cylinder's port 25ᵇ, and with a wing extension 32ᵇ for opening into the cylinder's port 25ᵇ when pressure is supplied to the cylinder's port 24ᵇ.

The cylinder's ports 24ᵇ and 25ᵇ are vertically elongated and preferably are of such size, shape and position that each of the pairs of ports (36 and 24ᵇ; 38 and 25ᵇ; 32ᵃ and 24ᵇ; and 32ᵇ and 25ᵇ) are by rotative movement overlapped in only a part of the vertical height of the piston port; and are then more extensively overlapped by vertical movement of the piston resulting from the auxiliary-motor port-reversal initiated by the rotative overlapping.

Thus, upon being started in upward or downward movement the piston itself, by such movement, effects further opening of its own partially opened ports, and the completion of its movement is thus assured, without the use of an over-center spring and without such falling off of valve-reversing pressure as occurs in the case of an over-center spring.

For reversal of the ports 22ᵇ, 21ᵇ, 23ᵇ of the main motor, the piston is formed with a hole 39 leading from its high-pressure recess 33 to a circumferentially elongated port 40, above the low-pressure recess 32, of such length that in all rotative positions of the piston the vertically aligned main-motor ports are within its length. The length of the port 40 thus can be the same as the circumferential dimension of the main part of the low-pressure recess 32. Likewise the piston is formed with a hole 41 leading from the high-pressure recess 33 to a circumferentially elongated port 42, below the low-pressure recess but otherwise corresponding to the port 40.

The vertical dimension of the main part of the low-pressure recess 32, and the vertical positioning of it and the elongated pressure ports 40 and 42, are such that when the piston is up suction is applied to the main-motor port 22ᵇ and pressure to the main-motor port 23ᵇ, and when the piston is down these conditions are reversed.

Preferably all port spacings are such that all ports of the main motor are fully closed before being reversed and that the same is true with regard to all ports of the auxiliary motor, because with this arrangement there is no non-working flow of fluid through either motor, and because the closing off of the ports of either motor causes all of the pressure differential to be applied momentarily to the other motor, to assure the completion of its stroke, whether or not the auxiliary motor's self-opening of its own ports is employed.

In the operation of the assembly, the parts being in the positions in which they are shown in Fig. 1, suction is being applied, through the hole 21, groove 21ª, port 21ᵇ, recess 32, registered recess-wing 32ª and port 24ᵇ, groove 24ª, hole 24 and port 24ᶜ to the lower end of the cylinder 18. At the same time atmospheric air pressure is being applied, through the port 34, hole 37, registered ports 38—25ᵇ, groove 25ª and port 25ᶜ, to the upper end of the cylinder. This holds the piston down against the turning plate 31, as shown.

Figure 3:
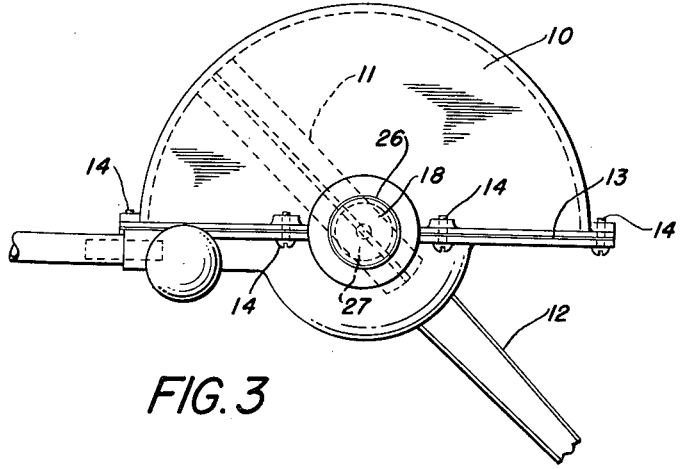
Fig. 3 is a plan view of the assembly.

With the piston in this position the elongated piston port 40 is applying atmospheric air pressure, through the cylinder port 22ᵇ, to one side of the main-motor vane 11, Fig. 3, while the piston recess 32 is applying suction, through the cylinder port 23ᵇ, to the other side of the vane 11. The main motor, as indicated by the position (Fig. 1) of the turning plate 31, is mid-way of its vane's movement, clockwise as viewed in Fig. 2 or Fig. 3.

When the plate 31 reaches the end of its lost motion it will engage the piston's legs 28, 28 and rotate the piston clockwise until the piston port 38 is out of registry with the cylinder port 25ᵇ and the suction-recess wing 32ª is out of registry with the cylinder port 24ᵇ. Then further clockwise rotation of the piston will overlap the upper half of the piston port 36 upon the lower end portion of the vertically elongated cylinder port 24ᵇ, at the same time overlapping the upper half of the suction-recess wing 32ᵇ upon the lower end portion of the vertically elongated cylinder port 25ᵇ.

Throughout this clockwise movement the ports of the main motor, 22ᵇ, 23ᵇ, remain full on and their reversal is not begun until the reversal of the auxiliary motor ports as just described causes the piston to move upward. As soon as the piston's upward movement starts, it effects an increasing overlapping of the then partly overlapped port 36 on the elongated port 24ᵇ, and of the partly overlapped recess-wing port 32ᵇ, on the elongated port 25ᵇ, which assures completion of up stroke of the piston. Also that is further assured by the fact that as soon as upward movement of the piston has started reversal of the main-motor ports 22ᵇ, 23ᵇ, an increasing part of the pressure differential is diverted to the ports of the auxiliary motor, for additionally urging the piston upward, such diversion being complete when the piston port 40 reaches, and the piston port 42 passes, their fully closed-off positions.

When the piston reaches its uppermost position the main-motor ports are of course fully reversed, which starts the return half-cycle of operation, corresponding, in reverse, to the half-cycle just described.

The assembly as described is such that there is no "dead-center," the closing off of the main-motor ports being at a different time from that of the auxiliary motor, and consequently one motor or the other always has its ports set for resumption of operation upon resumption of pressure differential.

The cylinder's ports, other than its air inlet 34, preferably are grouped on the suction side of the cylinder, not far from the piston's large suction recess 32, 32ª, 32ᵇ, and opposite the piston's large pressure recess 33, so that the pressure differential constantly snugs the piston against the left-hand side of the cylinder as viewed in Fig. 1 and thus provides self-energized sealing of all of the ports except the air-inlet 34.

With even a fairly close fitting of the piston in the cylinder there is apparently, for some reason, possibly a labyrinth seal effect or a Venturi effect, very little leakage of atmospheric air to the suction end of the piston, even without self-energizing or other end-packings 43, 43 on the piston.

Such packings can be used, however, without interfering with the self-energized sealing of the ports at the side of the piston, and further adaptations are possible without sacrifice of all of the advantages set out in the above statement of objects and without departure from the scope of the invention as defined by the appended claims.

I claim:

1. A motor assembly comprising a fluid-actuated main motor and a fluid-actuated auxiliary motor for reversing the main motor, each of said motors comprising a back-and-forth fluid-impelled member, a casing therewith defining two variable-volume chambers, and valve means having ports for cyclically charging and venting the said variable volume chambers, said auxiliary motor comprising a cylinder, a valve piston mounted in said cylinder for both oscillating and axially reciprocating movement therein, and means driven by the fluid-impelled member of the main motor for effecting oscillating movement of said valve piston while leaving it free for the said axially reciprocating movement, the said cylinder and the said valve piston being formed with coacting respective sets of main-motor ports of which the setting is cyclically reversed by axially reciprocating relative movement of said valve piston, and with coacting respective sets of auxiliary-motor ports of which reversal is initiated in each half-cycle by the aforesaid oscillating movement, the said cylinder having pressure-fluid-supplying means and exhaust means controlled by the aforesaid sets of auxiliary-motor ports, and said cylinder and said valve piston having at least one mating-and-unmating pair of auxiliary-motor ports so shaped and so positioned in the faces of the cylinder and the valve piston respectively that the ports of the said pair, in each half-cycle of operation, are partially overlapped one upon the other by rotative movement of the valve-piston effected by the said fluid-impelled member of the main motor, to the extent of starting fluid-impelled axial movement of said valve piston, and are then further so overlapped by that movement.

2. A motor assembly comprising a main motor having a back-and-forth fluid impelled member and, for controlling supply of pressure fluid to said main motor, an auxiliary motor comprising a cylinder and a valve piston mounted for both oscillating and reciprocating movement therein, the cylinder and the valve piston being formed with main motor ports cyclically reversed by reciprocating movement of the valve-piston and with auxiliary-motor ports cyclically reversed by oscillating movement of the valve piston, and means whereby the main motor, in each half-cycle of operation, initiates reversal of the auxiliary motor by rotative movement of the valve piston such as to partially overlap auxiliary-motor ports and thus start directly-fluid-impelled movement of the valve piston, said ports, thus partially overlapped, extending in such directions from their position of overlap that they are then immediately overlapped further by the said fluid-impelled movement of the said valve piston.

3. A fluid-actuated motor assembly comprising a main motor having a back-and-forth, fluid-impelled member and fluid-supply and exhaust means having a set of ports for actuating said member, and an auxiliary motor for controlling the said ports of the main motor, said auxiliary motor comprising a cylinder and an oscillating-and-reciprocating valve piston therein, said cylinder and said piston being respectively formed with main-motor ports spaced apart lengthwise of the cylinder and piston, and respectively formed with auxiliary-motor ports spaced apart circumferentially of the cylinder and piston, and means driven by the fluid-impelled member of the main motor for oscillating the valve piston, an auxiliary-motor port of the said cylinder having only a part of it in the oscillatory path of an auxiliary-motor port of the said piston and an additional part of it in the reciprocatory path of the last-mentioned port.

References Cited in the file of this patent

UNITED STATES PATENTS

| Number | Name | Date |
|---|---|---|
| 37,545 | Faulkner | Jan. 27, 1863 |
| 146,683 | Jamieson | Jan. 20, 1874 |
| 754,299 | Griffiths | Mar. 8, 1902 |
| 821,398 | Bergesen | May 22, 1906 |
| 1,077,568 | Sullivan et al. | Nov. 4, 1913 |
| 1,200,681 | Woodward | Oct. 10, 1916 |
| 1,301,225 | Cadwallader | Apr. 22, 1919 |
| 1,385,027 | Van Vleck et al. | July 19, 1921 |
| 2,075,959 | Previti | Apr. 6, 1937 |
| 2,101,159 | Stevens | Dec. 7, 1937 |